(12) United States Patent
Yamauchi et al.

(10) Patent No.: US 9,666,846 B2
(45) Date of Patent: *May 30, 2017

(54) NON-AQUEOUS ELECTROLYTE SECONDARY BATTERY

(71) Applicant: SANYO Electric Co., Ltd., Moriguchi-shi, Osaka (JP)

(72) Inventors: Yasuhiro Yamauchi, Moriguchi (JP); Naoya Nakanishi, Moriguchi (JP); Toshiyuki Nohma, Moriguchi (JP)

(73) Assignee: SANYO Electric Co., Ltd., Osaka (JP)

( * ) Notice: Subject to any disclaimer, the term of this patent is extended or adjusted under 35 U.S.C. 154(b) by 192 days.

This patent is subject to a terminal disclaimer.

(21) Appl. No.: 13/692,498

(22) Filed: Dec. 3, 2012

(65) Prior Publication Data

US 2013/0095352 A1 Apr. 18, 2013

Related U.S. Application Data

(63) Continuation of application No. 11/837,584, filed on Aug. 13, 2007, now abandoned.

(30) Foreign Application Priority Data

Aug. 11, 2006 (JP) .................. 2006-220677
Sep. 11, 2006 (JP) .................. 2006-246128

(51) Int. Cl.
*H01M 2/12* (2006.01)
*H01M 2/34* (2006.01)
*H01M 10/052* (2010.01)

(52) U.S. Cl.
CPC ........... *H01M 2/1276* (2013.01); *H01M 2/12* (2013.01); *H01M 2/34* (2013.01); *H01M 2/345* (2013.01);
(Continued)

(58) Field of Classification Search
CPC ............. H01M 2/1229; H01M 2/1241; H01M 200/202; H01M 2/02; H01M 2/345; H01M 2/12; H01M 2/34; H01M 2/1276
(Continued)

(56) References Cited

U.S. PATENT DOCUMENTS 5,705,290 A 1/1998 Azema
5,766,790 A * 6/1998 Kameishi et al. ............ 429/56
(Continued)

FOREIGN PATENT DOCUMENTS

CN 2505987 Y 8/2002
JP 59-41867 U 3/1984
(Continued)

OTHER PUBLICATIONS

Chinese Office Action dated Aug. 4, 2010, issued in corresponding Chinese Patent Application No. 200710140848.4.

*Primary Examiner* — Stephen Yanchuk
(74) *Attorney, Agent, or Firm* — Westerman, Hattori, Daniels & Adrian, LLP

(57) ABSTRACT

A non-aqueous electrolyte secondary battery includes an external electrode terminal, a current collecting tab, a lead, and first and second insulating members. The lead has a hollow portion, electrically connecting the external electrode terminal and the diaphragm. The diaphragm is placed to cover the hollow portion and allow the diaphragm to deform toward the hollow portion. The first insulating member is interposed between the sealing plate and the lead. The second insulating member is interposed between the diaphragm and the current collecting tab. Side walls of the first insulating member and side walls of the second insulating member are coupled to each other. The battery is configured such that the diaphragm deforms toward the outside of the battery when a gas pressure increases in the battery, thereby breaking an electric connection between the (Continued)

external electrode terminal and an electrode assembly of the battery.

19 Claims, 10 Drawing Sheets

(52) U.S. Cl.
CPC ........ *H01M 2/1229* (2013.01); *H01M 2/1241* (2013.01); *H01M 10/052* (2013.01); *H01M 2200/00* (2013.01); *H01M 2200/20* (2013.01); *Y10T 29/4911* (2015.01)

(58) Field of Classification Search
USPC ...................................................... 429/56, 61
See application file for complete search history.

(56) References Cited

U.S. PATENT DOCUMENTS

| | | | |
|---|---|---|---|
| 5,985,478 A * | 11/1999 | Kim ................................ 429/53 |
| 6,165,637 A * | 12/2000 | Azema ................ H01M 2/1241 |
| | | | 429/57 |
| 6,228,523 B1 * | 5/2001 | Azema ............................ 429/61 |
| 6,248,470 B1 | 6/2001 | Azema et al. |
| 2003/0091901 A1 * | 5/2003 | Kaneda et al. ............ 429/231.4 |
| 2004/0023107 A1 * | 2/2004 | Nakanishi et al. ........... 429/161 |
| 2004/0214075 A1 * | 10/2004 | Abe ..................... H01M 2/1241 |
| | | | 429/56 |
| 2005/0048365 A1 | 3/2005 | Miyahisa et al. |
| 2005/0287422 A1 * | 12/2005 | Kim ..................... H01M 2/1241 |
| | | | 429/53 |
| 2006/0078787 A1 | 4/2006 | Sato et al. |
| 2006/0115722 A1 | 6/2006 | Kim |
| 2006/0127774 A1 | 6/2006 | Kim et al. |
| 2006/0228620 A1 | 10/2006 | Martinson et al. |
| 2007/0026302 A1 * | 2/2007 | Yoon ............................. 429/129 |

FOREIGN PATENT DOCUMENTS

| | | |
|---|---|---|
| JP | 04-24262 U | 2/1992 |
| JP | 08-171898 A | 7/1996 |
| JP | 8-293301 A | 11/1996 |
| JP | 9-55197 A | 2/1997 |
| JP | 09-129214 A | 5/1997 |
| JP | 10-241653 A | 9/1998 |
| JP | 11-154504 A | 6/1999 |
| JP | 11-307080 A | 11/1999 |
| JP | 11-329405 A | 11/1999 |
| JP | 2000-150306 A | 5/2000 |
| JP | 2002-100340 A | 4/2002 |
| JP | 2003-031206 A | 1/2003 |
| JP | 2005-285565 A | 10/2005 |

* cited by examiner (a)

(b)

(a)

(b)

resin solution (c)

(a)
《before swaging》

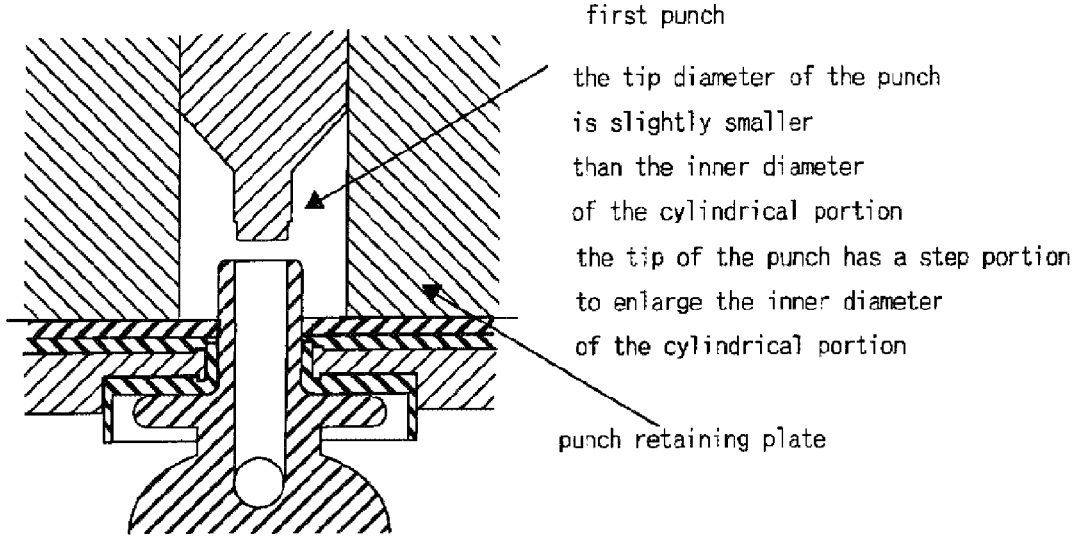

first punch the tip diameter of the punch
is slightly smaller
than the inner diameter
of the cylindrical portion
the tip of the punch has a step portion
to enlarge the inner diameter
of the cylindrical portion punch retaining plate (b)
《first swaging》

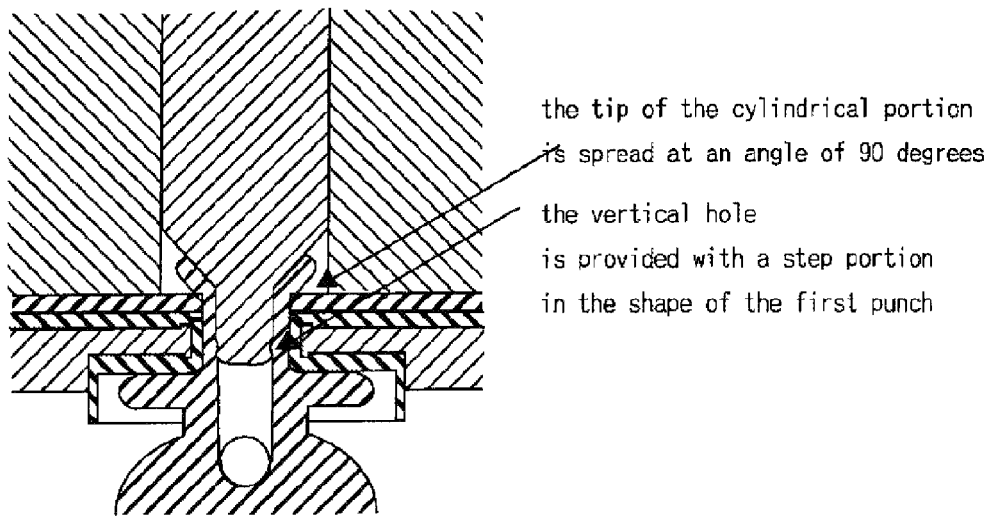

the tip of the cylindrical portion
is spread at an angle of 90 degrees the vertical hole
is provided with a step portion
in the shape of the first punch

Fig.10

(a)
《before second swaging》

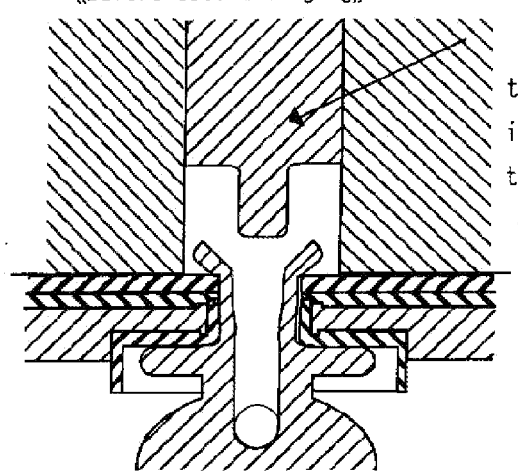

second punch the tip diameter of the punch
is slightly smaller
than the original inner diameter
of the cylindrical portion (b)
《second swaging》

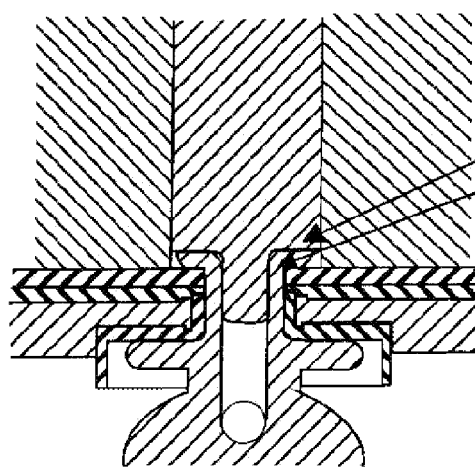

the tip of the cylindrical portion
is spread at an angle of 180 degrees

Of the tip of the cylindrical portion
spread in the first swaging,
the vicinity of the portion spread
at an angle of 180 degrees
is reduced to the tip diameter
of the second punch by swaging

a barrel-shaped enlarged diameter portion
is formed halfway in the vertical hole.

NON-AQUEOUS ELECTROLYTE SECONDARY BATTERY

CROSS-REFERENCE TO RELATED APPLICATIONS

This is a continuation application of U.S. patent application Ser. No. 11/837,584, filed on Aug. 13, 2007, which claims the benefit of priority from the prior Japanese Patent Application Nos. 2006-220677, filed on Aug. 11, 2006 and 2006-246128 filed on Sep. 11, 2006, the entire contents of which are incorporated herein by references.

BACKGROUND OF THE INVENTION

1. Field of the Invention

The present invention relates to non-aqueous electrolyte secondary batteries, and more particularly to non-aqueous electrolyte secondary batteries having a pressure-sensitive elastic element.

2. Description of the Prior Art

In recent years, non-aqueous electrolyte secondary batteries have been used not only in compact devices such as mobile phones, notebook PCs, and digital cameras but also as the power source for driving electric vehicles and hybrid vehicles.

When used for the latter application, a plurality of batteries are connected in series using their external electrode terminals so as to produce a high output. Non-aqueous electrolyte secondary batteries are made of highly reactive materials and therefore required to have a much higher safety level when used as large size batteries than when used in compact devices.

In attempts to improve the safety of large size batteries, various techniques have been proposed to install a pressure-sensitive elastic element in a battery (for example, refer to Patent Documents 1 to 8 shown below).

Patent Document 1: Japanese Utility Model No. 04-24262
Patent Document 2: Japanese Patent Unexamined Publication No. 10-241653
Patent Document 3: Japanese Patent Unexamined Publication No. 08-171898
Patent Document 4: Japanese Patent Unexamined Publication No. 08-293301
Patent Document 5: Japanese Patent Unexamined Publication No. 09-55197
Patent Document 6: Japanese Patent Unexamined Publication No. 11-307080
Patent Document 7: Japanese Patent Unexamined Publication No. 11-154504
Patent Document 8: Japanese Patent Unexamined Publication No. 11-329405

These techniques, however, are required to operate the pressure-sensitive elastic element smoothly when the battery internal pressure increases above a certain level. To achieve this, it is preferable that the space on the outer side of the battery is communicated with the atmosphere outside the battery so as to prevent the pressure of the pressure-sensitive elastic element from increasing on the outer side of the battery when the pressure-sensitive elastic element deforms. However, when the space is communicated with the atmosphere outside the battery, the pressure-sensitive elastic element may be damaged by moisture or oxygen entering from the outside of the battery. As a result, the pressure-sensitive elastic element may not operate at a desired operating pressure.

The batteries shown in the aforementioned patent documents are not intended to be connected in series at short distances with other batteries. Therefore, these documents contain no technical suggestion of operating a pressure-sensitive elastic element in combination with the external electrode terminal. Under such circumstances, there is a growing expectation for batteries having a pressure-sensitive elastic element that can operate reliably and speedily when an abnormal stats occurs in a battery, particularly in a large size battery having an external electrode terminal.

SUMMARY OF THE INVENTION

An object of the present invention is to provide a non-aqueous electrolyte secondary battery having the following characteristics. The battery has an external electrode terminal so as to be connected in series at short distances with other batteries and also has a pressure-sensitive elastic element operating reliably and speedily when a desired operating pressure is reached so as to excel in usability and safety.

In order to achieve the object, the non-aqueous electrolyte secondary battery having the fundamental structure (referred to as a first aspect) of the present invention includes;

an outer can having an opening;

an electrode assembly housed in the outer can, the electrode assembly comprising a positive electrode having a positive electrode current collector and a negative electrode having a negative electrode current collector;

a sealing plate sealing the opening; and an external electrode terminal projecting outside the sealing plate.

The external electrode terminal and the electrode assembly are electrically connected to each other via an electric conduction path, the electric conduction path having a pressure-sensitive elastic element halfway therein, the pressure-sensitive elastic element deforming in accordance with an increase in the gas pressure in the battery.

The external electrode terminal includes therein a continuous hole connecting the outside of the battery and the space in contact with the outer side of the pressure-sensitive elastic element.

This structure enables the pressure applied to the outer side of the pressure-sensitive elastic element to be kept equal to the pressure outside the battery (the atmospheric pressure), so that the pressure-sensitive elastic element easily deforms in accordance with an increase in the battery internal pressure. As a result, when the battery internal pressure increases to a predetermined value, the pressure-sensitive elastic element operates reliably and speedily, thereby interrupting the current flow and/or releasing the gas in the battery. In this structure, the external electrode terminal includes therein the continuous hole connecting the space in contact with the outer side of the pressure-sensitive elastic element and the outside of the battery, thereby eliminating the need to provide a pressure release hole. In other words, this structure allows the external electrode terminal to have not only the original function as an electrode terminal but also the function as a pressure release passage, thereby simplifying the battery structure.

In the aforementioned structure of the present invention, the pressure-sensitive elastic element may be designed to deform in accordance with the increase in the gas pressure in the battery so as to interrupt electrical connection between the external electrode terminal and the electrode assembly (a second aspect of the present invention).

This structure enables the pressure-sensitive elastic element to speedily interrupt current flow when gas is generated in the battery, thereby suppressing battery runaway.

The pressure-sensitive elastic element can be a type which breaks to release the gas generated in the battery, a type which deforms to interrupt the current flow between the electrode and the external electrode terminal, or other types. For example, a diaphragm or a return safety valve having a disc spring can be used. It is more preferable to use a diaphragm that deforms in accordance with an increase in the gas pressure in the battery and interrupts the electrical connection between the external electrode terminal and the electrode assembly.

In the non-aqueous electrolyte secondary battery of the second aspect of the present invention, the sealing plate may include a gas relief valve, the gas relief valve being opened when the sealing plate is applied with a gas pressure higher than an operating gas pressure of the pressure-sensitive elastic element interrupting the electrical connection between the external electrode terminal and the electrode assembly (a third aspect of the present invention).

In this structure, if the gas pressure in the battery increases even after the pressure-sensitive elastic element interrupts the current flow, then the gas relief valve operates to release the gas in the battery to the outside, thereby further increasing the safety of the battery.

In the non-aqueous electrolyte secondary battery of each of the first to third aspects of the present invention, the continuous hole may be sealed by a membrane plug (12) disposed halfway in the continuous hole, the membrane plug being made of a resin film (a fourth aspect of the present invention).

In this structure, when the battery is operating normally, the membrane plug (12) formed in the continuous hole protects the battery from the entry of moisture or oxygen, thereby preventing the pressure-sensitive elastic element from being damaged by moisture or oxygen entering through the continuous hole. The membrane plug made of a resin film, on the other hand, is too fragile to withstand the pressure change due to the deformation of the pressure-sensitive elastic element. Therefore, when an abnormal stats occurs in the battery and hence the internal pressure increases, the membrane plug is easily broken. Thus, the membrane plug never disturbs the operation of the pressure-sensitive elastic element.

In the non-aqueous electrolyte secondary battery of the fourth aspect of the present invention, the continuous hole may be formed in the external electrode terminal (1) and consist of a vertical hole (1a) and a horizontal hole (1b), the vertical hole (1a) extending in the axial direction from the inner end of the battery, and the horizontal hole (1b) having an opening open to the outside of the battery and being communicated with the vertical hole (1a) (a fifth aspect of the present invention).

Such a hole consisting of a vertical hole and a horizontal hole can be easily formed inside the external electrode terminal and can also function conveniently as a hole connecting the inside and outside of the battery because the horizontal hole is open to the outside of the battery.

In the non-aqueous electrolyte secondary battery of the fifth aspect of the present invention, the vertical hole (1a) maybe provided with an enlarged diameter portion (1c) whose inner diameter is enlarged in the shape of a ring; and the membrane plug (12) may be formed in the enlarged diameter portion (1c) (a sixth aspect of the present invention).

The enlarged diameter portion formed in the vertical hole functions as a fixing frame for the positioning and fixing of the membrane plug, thereby facilitating the formation and preventing the displacement of the membrane plug in the vertical hole.

A method of the present invention for producing a non-aqueous electrolyte secondary battery (a seventh aspect of the present invention) may be a method for producing a non-aqueous electrolyte secondary battery including an outer can having an opening; an electrode assembly (10) housed in the outer can, the electrode assembly (10) comprising a positive electrode having a positive electrode current collector and a negative electrode having a negative electrode current collector; a sealing plate (3) sealing the opening; an external electrode terminal (1) whose one end is engaged with the throughhole of the sealing plate (3) and whose other end projects outside the sealing plate (3); and a pressure-sensitive elastic element deforming in accordance with an increase in the gas pressure in the battery, the external electrode terminal (1) having therein a hole connecting the outside of the battery and the space in contact with the outer side of the pressure-sensitive elastic element. The method may include a step of forming a membrane plug by injecting a resin solution into the vertical hole through the opening of the horizontal hole of the external electrode terminal (1), the resin solution containing a solvent and a resin dissolved or dispersed in the solvent, and then by volatilizing the solvent in the resin solution so as to form a resin film as the membrane plug.

This structure enables the effective production of the non-aqueous electrolyte secondary battery with an external electrode terminal having a membrane plug in its continuous hole. Examples of the aforementioned solvent include toluene, xylene, chlorobenzene, chloromethane, chloroethane, methanol, methyl acetate, ethyl ether, and acetone. Examples of the aforementioned resin include fluorine resin, polyolefin resin, phenolic resin, epoxy resin, polyimide resin, polyvinyl chloride resin, and silicon resin.

In the method of the present invention for producing a non-aqueous electrolyte secondary battery, the step of forming the membrane plug may be performed after the battery is assembled (an eighth aspect of the present invention).

The formation of the membrane plug after the assembly of the battery eliminates the risk that the membrane plug breaks during the battery assembly process, thereby increasing the membrane plug formation yield.

In the aforementioned method of the present invention for producing a non-aqueous electrolyte secondary battery, the non-aqueous electrolyte secondary battery may further include a gasket having a throughhole disposed on the outer side of the sealing plate (3) and an insulating plate having a throughhole disposed on the inner side of the sealing plate (3), the external electrode terminal (1) having a flange (1d) parallel to the axial direction; and the method may further include a step of swaging in which the gasket and the insulating plate are disposed on the outer surface and the inner surface, respectively, of the sealing plate (3) in such a manner that the throughholes of the gasket and the insulating plate overlap with the throughhole of the sealing plate (3); then the external electrode terminal (1) is fitted in the throughholes thus overlapped; and then the gasket, the sealing plate (3), and the insulating plate are vertically swaged both from the top end surface of the external electrode terminal (1) and from the flange so as to be tightly fixed together and also to form an enlarged diameter portion (1c) in the hole of the external electrode terminal (1), the enlarged diameter portion (1c) being enlarged in the shape of a ring (a ninth aspect of the present invention).

In this structure, the enlarged diameter portion can hold a large amount of resin solution to ensure the formation of the membrane plug in this portion. Furthermore, the membrane plug, which is large than the diameter of the hole, can be tightly fixed and never be displaced vertically. Thus, the membrane plug can be formed easily.

The enlarged diameter portion preferably has a 1.05 to 1.2 times larger diameter than the vertical hole, and the diameter of the vertical hole is preferably 0.8 to 3 mm. These conditions allow the membrane plug to be formed reliably and easily.

In the aforementioned method of the present invention for producing a non-aqueous electrolyte secondary battery, the resin may be a fluorine resin, and the solvent may be a xylene-based solvent (more specifically, paraxylene hexafluoride) (a tenth aspect of the present invention).

A xylene-based solvent has the ability to dissolve a fluorine resin and is easily volatilized, making it easy to form the membrane plug. In addition, the fluorine resin has good sealing property suitable as a membrane plug material. Such a fluorine resin can be a copolymer including a fluoroalkyl or perfluoroalkyl group, such as a fluoroalkyl acrylate copolymer, a perfluoroalkyl acrylate copolymer, or a perfluoroalkyl methacrylate copolymer.

As described hereinbefore, the present invention provides a non-aqueous electrolyte secondary battery that has a pressure-sensitive elastic element operating reliably and speedily and that prevents time degradation due to moisture, oxygen or the like entering from the outside of the battery.

BRIEF DESCRIPTION OF THE DRAWINGS

FIGS. 9A and 9B show a process of swaging.

FIGS. 10A and 10B show another process of the swaging.

Figure 1:
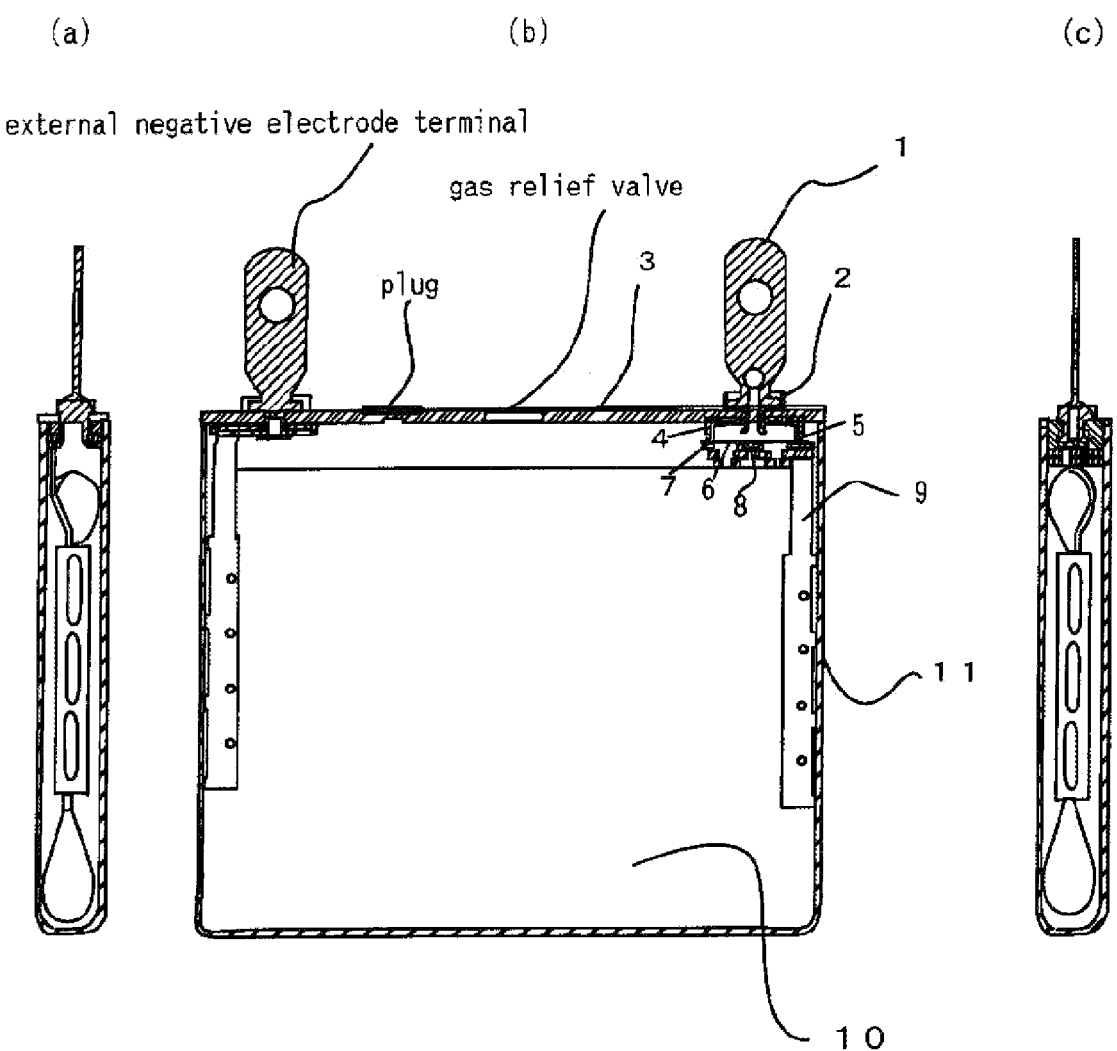
FIGS. 1A, 1B, and 1C are sectional views of a battery according to the present invention.

REFERENCE MARKS IN THE DRAWINGS 1 external positive electrode terminal
1a vertical hole
1b horizontal hole
1c enlarged diameter portion
1d flange
2 gasket
3 sealing plate
4 insulating plate
5 sealing lead
6 pressure-sensitive elastic element (diaphragm)
7 current collecting tab holder
9 current collecting tab
10 electrode assembly
11 outer can
12 membrane plug

DESCRIPTION OF THE PREFERRED EMBODIMENT

A preferred embodiment of the present invention is described in detail as follows with reference to drawings.

Figure 2:
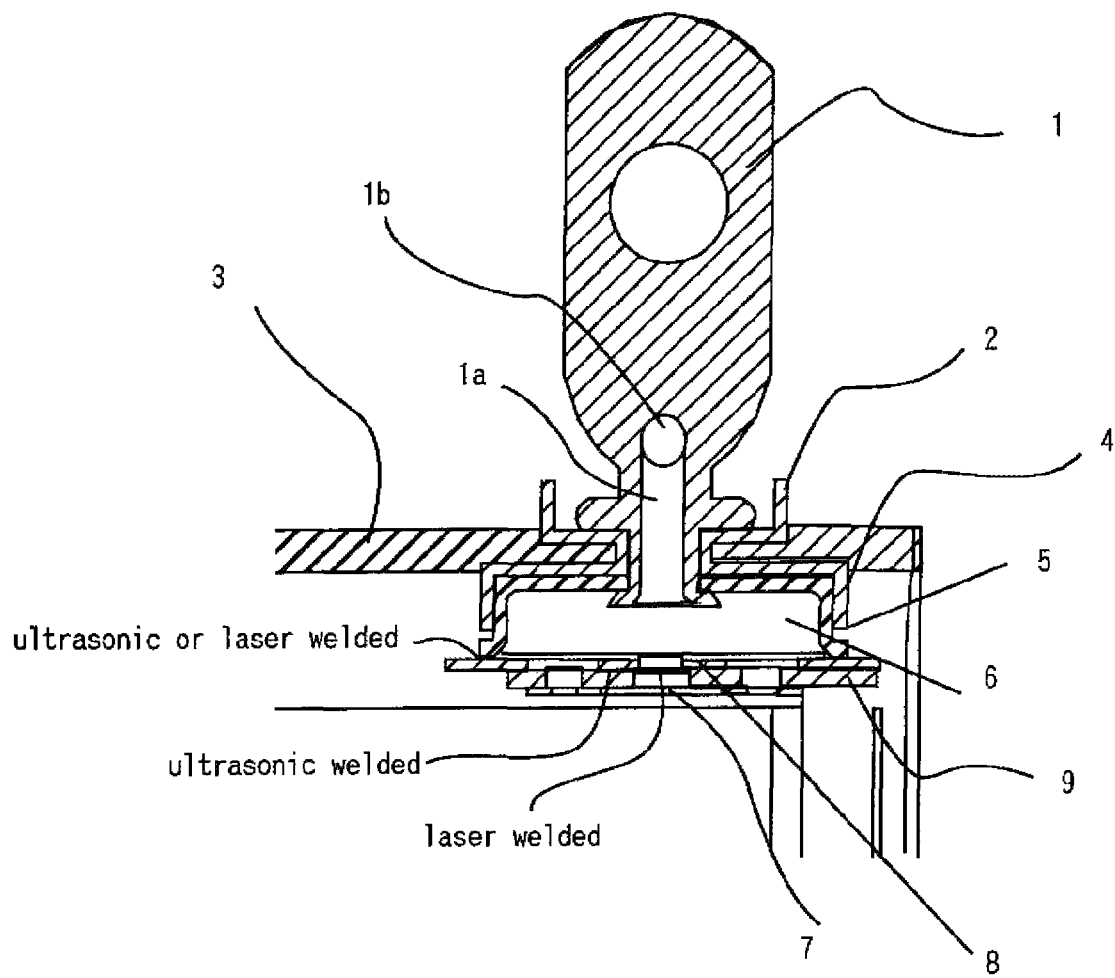
FIG. 2 is an enlarged sectional view of an essential part of the battery according to the present invention.
Figure 3:
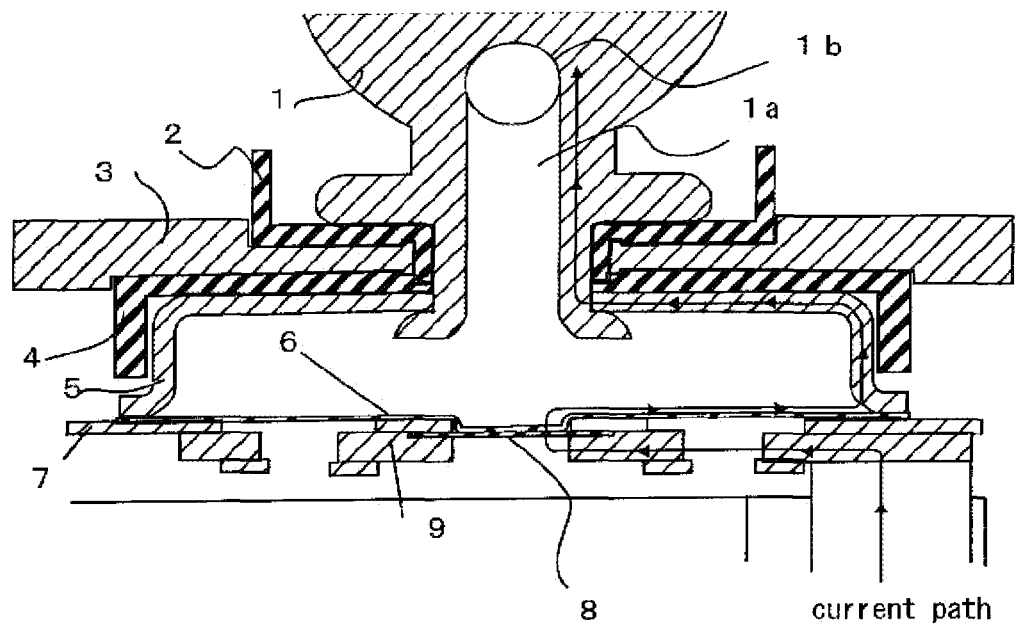
FIGS. 3A and 3B show the operation of the diaphragm of the battery according to the present invention.
Figure 3:
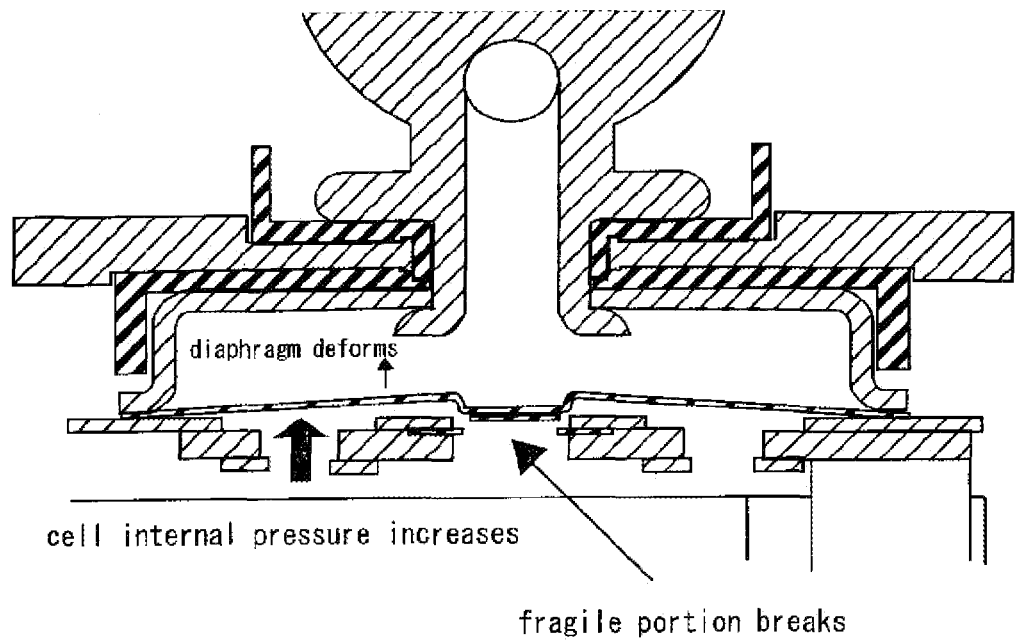
Figure 4:
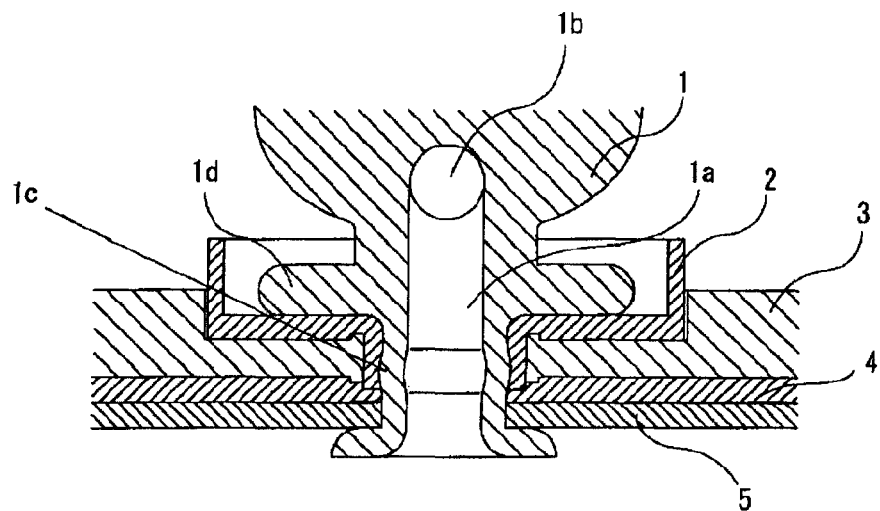
FIGS. 4A, 4B, and 4C show processes of forming a membrane plug of the battery according to the present invention.
Figure 4:
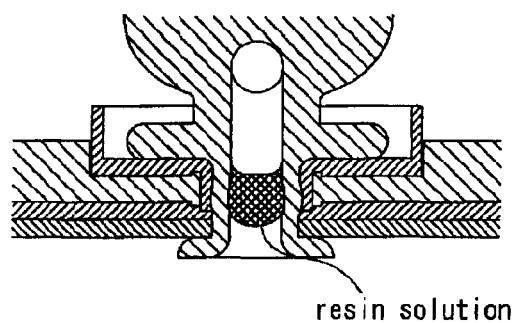
Figure 4:
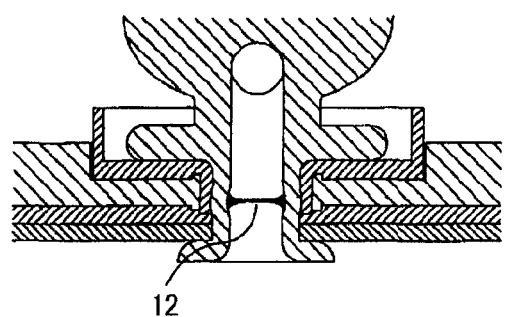
Figure 5:
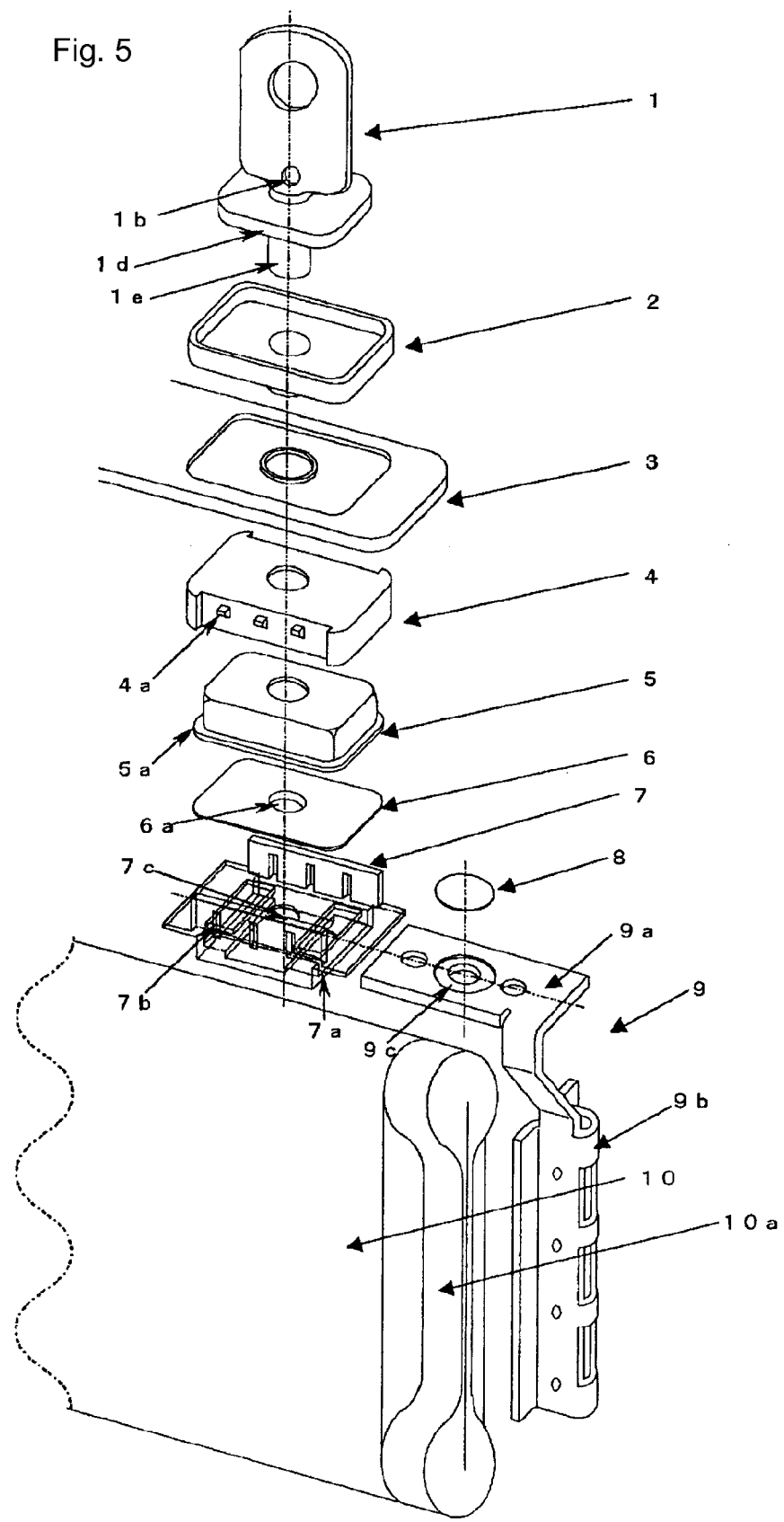
FIG. 5 is an exploded perspective view of the battery according to the present invention.
Figure 6:
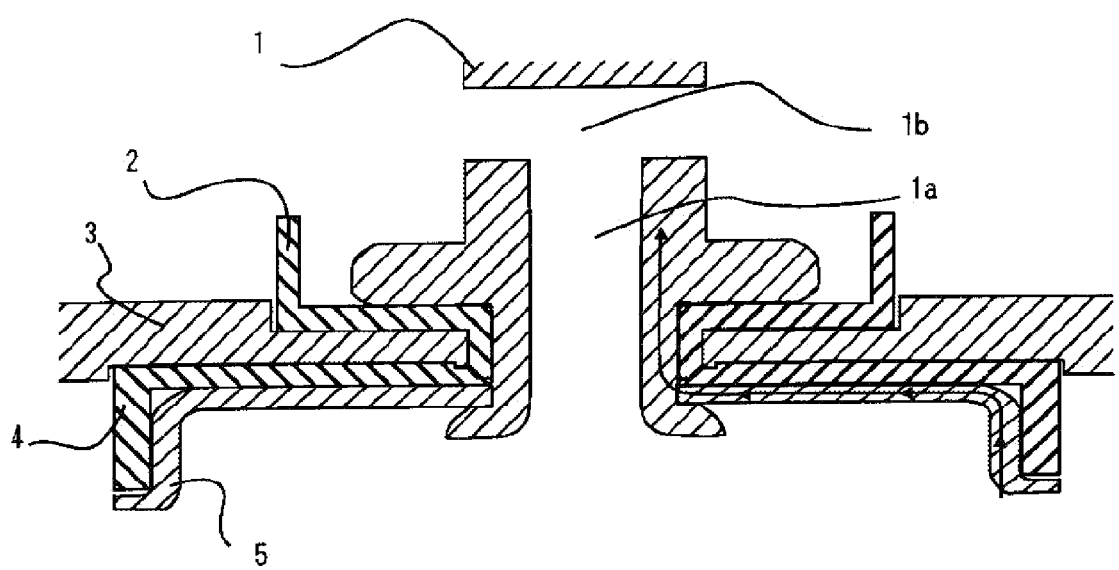
FIG. 6 is another enlarged sectional view of the essential part of the battery according to the present invention.
Figure 7:
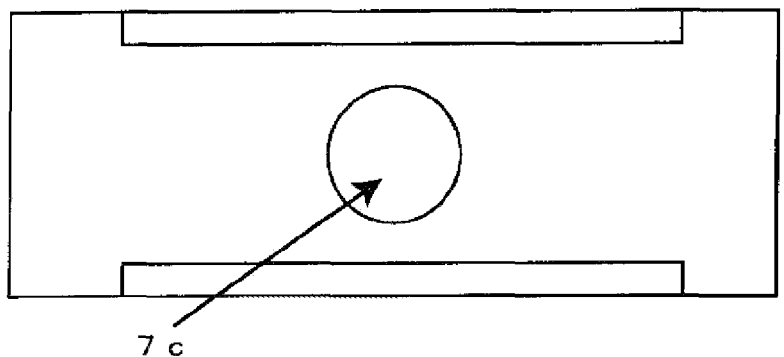
FIGS. 7A, 7B and 7C are a plan view, a front view, and a right side view, respectively, of the current collecting tab holder of the battery according to the present invention.
Figure 7:
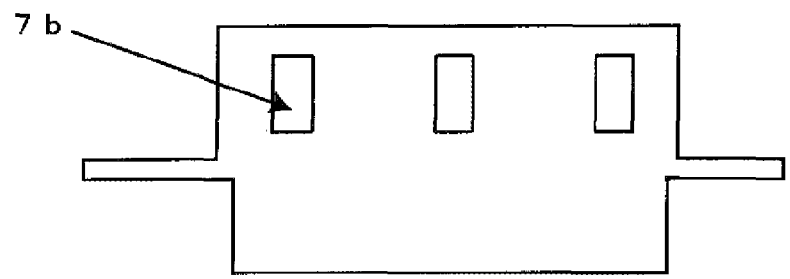
Figure 7:
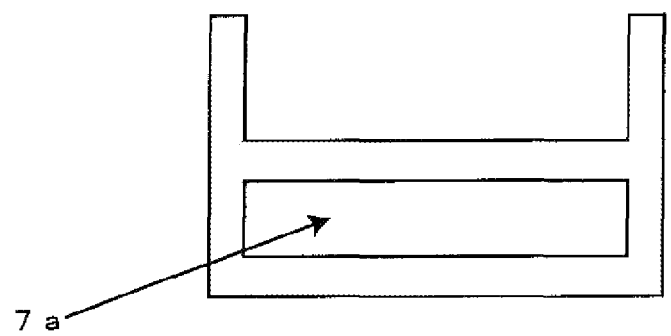

FIGS. 1A-1C are sectional views of a battery according to the present invention; FIG. 2 is an enlarged sectional view of an essential part of the battery; FIGS. 3A and 3B show the operation of a diaphragm, which is an example of the pressure-sensitive elastic element of the battery; FIGS. 4A-4C show processes of forming a membrane plug of the battery; FIG. 5 is an exploded perspective view of the battery; FIG. 6 is another enlarged sectional view of the essential part of the battery; FIGS. 7A-7C show the current collecting tab holder of the battery; and FIGS. 9A, 9B, 10A and 10B show processes of swaging.

As shown in FIGS. 1A-1C, the battery of the present invention includes an outer can 11 and a coiled electrode assembly 10 housed in the outer can 11 laterally to the can axis. The electrode assembly 10 comprises positive and negative electrodes coiled together. The outer can 11 is sealed with a sealing plate 3 having a gas relief valve. The sealing plate 3 has an external positive electrode terminal 1 and an external negative electrode terminal projecting outside the battery therefrom.

As shown in FIG. 5, the electrode assembly 10 has positive-electrode current-collector protrusions 10a projecting from one end thereof. The positive-electrode current-collector protrusions 10a are connected to a current collector connecting portion 9b of a current collecting tab 9. The positive-electrode current-collector protrusions 10a are a bundle of the protrusions of the positive electrode current collector protruding from one end of the electrode assembly 10.

As shown in FIG. 2, the external positive electrode terminal 1, which is an external electrode terminal and in contact with a gasket 2, is fitted in the sealing plate 3. The external positive electrode terminal 1 is also in contact with an insulating plate 4 and a sealing lead 5 on the inner side of the sealing plate 3. The sealing lead 5 is welded to a diaphragm 6, thereby providing an electrical connection between the diaphragm 6 and the external positive electrode terminal 1.

As shown in FIGS. 2 and 3A, the inner center portion of the diaphragm 6 is in contact with the center portion of an interrupting foil 8. The periphery of the interrupting foil 8 covers a throughhole 9c formed in an insert member 9a of the current collecting tab 9 disposed below the diaphragm 6. The diaphragm 6 and the interrupting foil 8 form the pressure-sensitive elastic element.

FIG. 5 is an exploded perspective view of an essential part of the battery before the insert member 9a of the current collecting tab 9 is inserted into a tab receiving portion 7a of a current collecting tab holder 7. FIGS. 7A-7C show the current collecting tab holder 7. As shown in FIG. 5, the current collecting tab 9 includes the insert member 9a to be inserted into the tab receiving portion 7a of the current collecting tab holder 7 and the current collector connecting portion 9b to be connected to the positive-electrode current-collector protrusions 10a of the electrode assembly 10. The tab receiving portion 7a is provided on both the inner and outer surfaces thereof with a holder hole 7c. The holder hole 7c is equal to or larger in area than the throughhole 9c. As shown in FIG. 5, the insert member 9a of the current collecting tab 9 is inserted into the tab receiving portion 7a of the current collecting tab holder 7.

Figure 8:
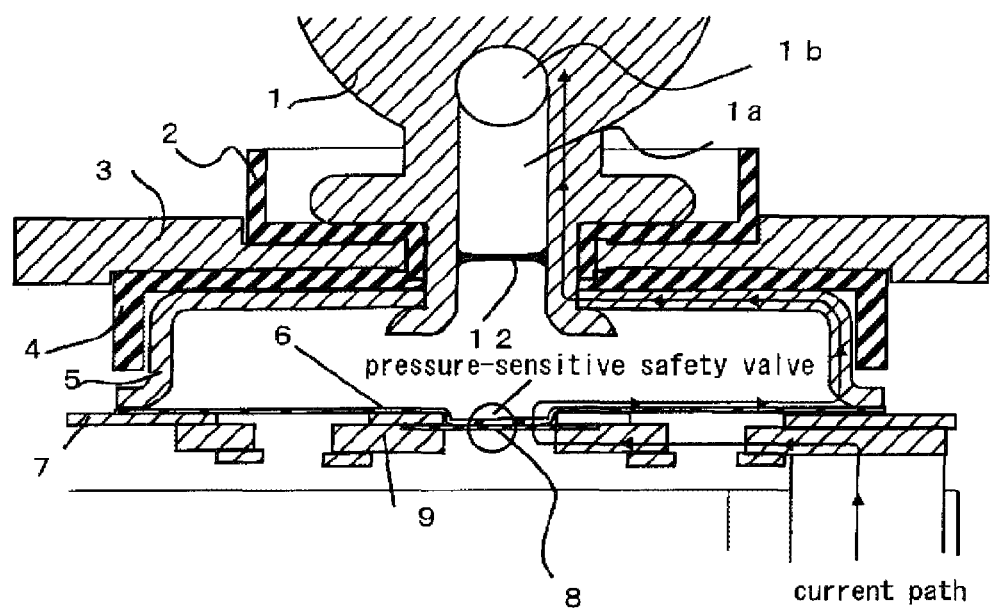
FIGS. 8A and 8B show the diaphragm of the battery according to the present invention respectively before and after being operated.
Figure 8:
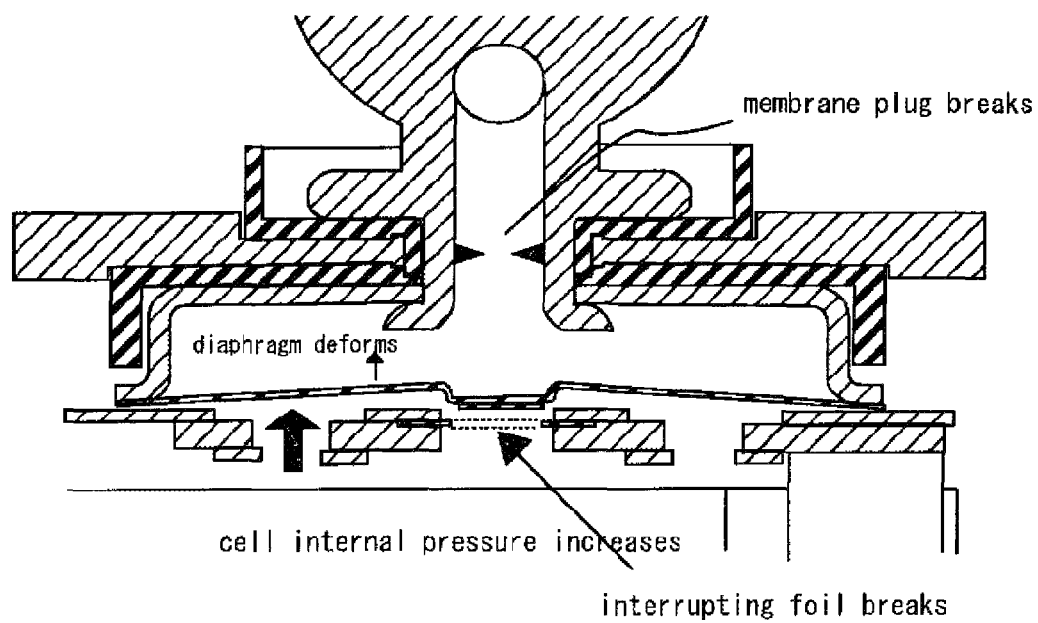

The connected portion between the external electrode terminal and the sealing plate is shown in a lateral sectional view in FIGS. 3A and 3B and shown in a longitudinal sectional view in FIG. 6. The external positive electrode terminal 1 includes therein a hole consisting of a vertical hole 1a and a horizontal hole 1b. The vertical hole 1a extends in the axial direction from the inner end to the outer end of the battery. The horizontal hole 1b has an opening open to the outside of the battery and is communicated with the vertical hole 1a. The vertical hole 1b may be provided with a membrane plug 12 made of a resin film as shown in FIG. 8A so as to seal the hole. The horizontal hole 1b may be open at one side only.

FIGS. 3A and 3B show the operation of the diaphragm of the battery of the present invention. When the battery internal pressure is normal, as shown in FIG. 3A, the diaphragm 6 is supplied with a current from the current collecting tab 9 via the interrupting foil 8. When the battery internal pressure increases, on the other hand, as shown in FIG. 3B, the center portion of the diaphragm 6 rises toward the outside of the battery. This causes the interrupting foil 8 in contact with the diaphragm 6 to break, thereby interrupting the current flow from the current collecting tab 9 to the diaphragm 6. In the case where the vertical hole has the membrane plug 12 halfway therein as shown in FIG. 8A, the rising of the diaphragm 6 causes the membrane plug 12 to deform upward or to break.

In the aforementioned structure, the current collecting tab holder 7 protects the interrupting foil 8 formed in the planar insert member 9a of the current collecting tab 9 from impact or vibration. This prevents the interrupting foil 8 from being erroneously broken by impact.

How to assemble the current interrupting mechanism of the battery of the present invention is described with reference to FIG. 5. First of all, the coiled electrode assembly is prepared. The electrode assembly is disposed in such a manner that the protrusions of the positive electrode current collector protrude from one end thereof and the protrusions of the negative electrode current collector protrude from the other end thereof.

Next, the gasket 2 and the external positive electrode terminal 1 are stacked together from the side of the sealing plate 3 that corresponds to the outside of the battery. The insulating plate 4 and the sealing lead 5 are stacked together from the side of the sealing plate 3 that corresponds to the inside of the battery. The external electrode terminal 1 is provided at its bottom with a cylindrical portion 1c, which penetrates the respective holes of the gasket 2, the sealing plate 3, the insulating plate 4, and the sealing lead 5.

These members thus stacked are compressed vertically (in up and down directions) from the top end surface of the external positive electrode terminal 1 and from the flange 1d side until the gasket 2 and the insulating plate 4 achieve a predetermined compressibility. The cylindrical portion 1c at the bottom of the external electrode terminal 1 is spread outward (swaged) to form an enlarged diameter portion 1c and fixed (refer to FIG. 4A).

The enlarged diameter portion 1c is formed as follows. First, a punch is used which has a tip portion slightly smaller in diameter than the vertical hole 1a and a step portion to enlarge the diameter of the vertical hole 1a. The punch is inserted into the vertical hole 1a of the external positive electrode terminal 1 so as to slightly swage the tip of the external positive electrode terminal 1. Then, another punch having a tip portion slightly smaller in diameter than the vertical hole 1a is inserted into the vertical hole 1a of the external positive electrode terminal 1 so as to fully swage the portion to be swaged (refer to FIGS. 9A, 9B, 10A, and 10B where the external positive electrode terminal 1 is drawn upside down so that the portion to be swaged is shown in the top).

The diaphragm 6 is stacked on a flange 5a of the sealing lead 5, and their contact area is entirely laser welded from the diaphragm 6 side so as to be sealed.

The interrupting foil 8 is stacked on the throughhole 9c, which has a step portion, of the insert member 9a of the positive electrode current collecting tab 9, and their contact area is ultrasonic welded.

The insert member 9a of the positive electrode current collecting tab 9 is inserted into the tab receiving portion 7a of the current collecting tab holder 7. The tab receiving portion 7a is slightly larger than the insert member 9a, so that when the insert member 9a is inserted, the current collecting tab holder 7 and the positive electrode current collecting tab 9 are fixed to each other.

In the same manner as in the external positive electrode terminal described above, in the external negative electrode terminal, a gasket, an insulating plate, and a sealing lead are stacked together and swaged.

Hooks 4a of the insulating plate 4 are engaged with the fixing portions 7b of the current collecting tab holder 7 so as to fix the current collecting tab holder 7 and the insulating plate 4 to each other. The diaphragm 6 comes into contact at a center bottom 6a thereof with the interrupting foil 8 via the holder hole 7c of the current collecting tab holder 7.

The interrupting foil 8 is welded to the diaphragm 6 by applying laser spot welding from the side of the positive electrode current collecting tab 9 that is opposite to the side on which the interrupting foil 8 has been welded. As a result, the gas pressure in the battery acts on the interrupting foil 8 and the inner side of the diaphragm 6.

The positive-electrode current-collector protrusions 10a of the electrode assembly 10 are inserted into the bundled core of the positive electrode current collecting tab 9. The current collector connecting portion 9b is swaged to hold the positive-electrode current-collector protrusions 10a. Then, laser welding is applied to the side surface of the current collector connecting portion 9b so as to connect the positive electrode current collecting tab 9 and the electrode assembly 10. Then, in the negative electrode, a negative electrode current collecting tab is connected in the same manner.

A non-aqueous electrolytic solution is poured into the outer can 11, and the sealing plate 3 is laser welded to the outer can 11.

As shown in FIGS. 4B and 4c, a resin solution, which is formed by dissolving a fluorine resin (a fluoroalkyl acrylate copolymer) in a xylene-based solvent, is poured into the enlarged diameter portion 1c of the vertical hole 1a through the opening of the horizontal hole 1b of the external positive electrode terminal 1. Then, the solvent in the resin solution is volatilized to form the membrane plug 12, thereby completing the battery of the present invention.

Ten batteries having a 80 μm thick interrupting foil 8 were produced as the batteries of the embodiment.

Another ten batteries having the same structure as the batteries of the embodiment except for the absence of the continuous hole were produced as comparative batteries.

The current interrupting pressures of the batteries of the embodiment were measured and found to be 0.5 to 0.7 MPa. On the other hand, the current interrupting pressures of the comparative batteries were not able to be measured because the gas relief valve was actuated when the pressures reached around 1.0 MPa. Therefore, the current interrupting pressures were measured again after a metal plate was welded to the gas relief valve so as to prevent the actuation of the gas relief valve. As a result, the current interrupting pressures of the comparative batteries increased to 1.5 MPa to 2.8 MPa with a larger variation than in the batteries of the embodiment.

Another five batteries of the present invention in which the vertical hole has the membrane plug 12 were stored for ten days at a temperature of 60° C. and at a humidity of 80%. Then, the batteries were filled with gas and pressurized to examine the operating pressure of the interrupting foil.

As a result, it was confirmed that in the five batteries the interrupting foil operated within the error of 5% of the desired pressure value.

INDUSTRIAL APPLICABILITY

As described hereinbefore, the non-aqueous electrolyte secondary battery of the present invention, which has a pressure-sensitive elastic element with stable operation and little time degradation, is industrially useful.

What is claimed is:

1. A non-aqueous electrolyte secondary battery comprising:
    a prismatic outer can having an opening;
    an electrode assembly housed in the outer can and including a positive electrode and a negative electrode;
    a sealing plate sealing the opening;
    a current collecting tab electrically connected to either the positive electrode or the negative electrode;
    an external electrode terminal projecting outside the sealing plate;
    a diaphragm disposed at a position of the battery, the position being inner than the sealing plate and outer than the current collecting tab, the diaphragm being conductive and electrically connected to the external electrode terminal and the current collecting tab;
    a lead having a hollow portion to which the diaphragm is placed to cover the hollow potion and to allow the diaphragm to deform toward the hollow portion, the lead electrically connecting the external electrode terminal and the diaphragm;
    a first electrically insulating member interposed between the sealing plate and the lead; and
    a second electrically insulating member interposed between the diaphragm and the current collecting tab, wherein
    the second electrically insulating member has a throughhole, and an electric conduction path between the external electrode terminal and the electrode assembly passes through the throughhole;
    the first electrically insulating member includes a pair of first side walls extending toward an inside of the battery from a body of the first electrically insulating member;
    the second electrically insulating member includes a pair of second side walls extending toward an outside of the battery from a body of the second electrically insulating member;
    the first side walls and the second side walls are coupled to each other;
    the diaphragm deforms toward the outside of the battery in accordance with an increase in a gas pressure in the battery, thereby breaking an electric connection between the external electrode terminal and the electrode assembly;
    the sealing plate includes a gas relief valve in a portion distant from the diaphragm;
    the diaphragm seals a bottom end of the hollow portion of the lead and keeps the hollow portion of the lead sealed even after the gas relief valve operates to release gas from inside the battery;
    the sealing plate is rectangular;
    the first side walls have a plurality of projections on an outer surface thereof; and
    the projections are arranged at intervals along a longitudinal side of the sealing plate so as to be fitted into the second side walls, the projections being engaged with the second side walls.

2. The non-aqueous electrolyte secondary battery of claim 1, further comprising a third insulating member, wherein
    the external electrode terminal has a flange and a connecting portion disposed at one end of the flange;
    the third insulating member is disposed at a position between the flange and an outer surface of the sealing plate;
    the connecting portion penetrates a through hole formed in each of the third insulating member, the sealing plate, the first electrically insulating member, and the lead, a tip of the connecting portion being swaged inside the battery with respect to the sealing plate; and
    the flange is located outside the battery with respect to the sealing plate.

3. The non-aqueous electrolyte secondary battery of claim 1,
    wherein
    the first side walls have a projection on an outer surface side thereof, and the second side walls include a fixing portion to be engaged with the projection; and
    the projection and the fixing portion are engaged with each other to connect the first side walls and the second side walls together.

4. The non-aqueous electrolyte secondary battery of claim 1, wherein
    the second side walls have inner surfaces extending toward the outside of the battery from the body of the second electrically insulating member;
    the first side walls have outer surfaces extending toward the inside of the battery from the body of the first electrically insulating member;
    the inner surfaces and the outer surfaces are faced and coupled in a direction parallel to the sealing plate to form a pair of the coupled surfaces facing to each other in the direction; and
    the lead is placed between the pair of the coupled surfaces.

5. The non-aqueous electrolyte secondary battery of claim 1, further comprising:
    an external positive electrode terminal electrically connected to the positive electrode; and
    an external negative electrode terminal electrically connected to the negative electrode, wherein
    the sealing plate is rectangular and has a first throughhole and a second throughhole, the first throughhole having the external positive electrode terminal inserted therein, the second throughhole having the external negative electrode terminal inserted therein;

the gas relief valve of the sealing plate is disposed between the first and second throughholes, the first and second throughholes being spaced from the gas relief valve along a longitudinal side of the sealing plate; and the external electrode terminal is either the external positive electrode terminal or the external negative electrode terminal.

6. The non-aqueous electrolyte secondary battery of claim 5, wherein the gas relief valve is electrically insulated from the external positive electrode terminal and the external negative electrode terminal.

7. The non-aqueous electrolyte secondary battery of claim 1, wherein
the diaphragm has, at a center thereof, an annular stepped portion; and
the stepped portion has inside a planar portion parallel to the sealing plate.

8. The non-aqueous electrolyte secondary battery of claim 1, wherein the current collecting tab has a fragile portion thinner than a region surrounding the fragile portion, the fragile portion breaking due to deformation of the diaphragm.

9. The non-aqueous electrolyte secondary battery of claim 1, wherein
the sealing plate is rectangular;
the first side walls have a plurality of hooks on an outer surface thereof; and
the hooks are arranged at intervals along a longitudinal side of the sealing plate so as to be fitted into the second side walls.

10. The non-aqueous electrolyte secondary battery of claim 1, wherein
the lead includes a region parallel to the sealing plate and an annular wall portion, the annular wall portion extending from a periphery of the region parallel to the sealing plate toward the inside of the battery;
the region parallel to the sealing plate and the annular wall portion are located closer to the inside of the battery than the sealing plate is;
the first electrically insulating member is interposed between the sealing plate and the region parallel to the sealing plate;
the periphery of the diaphragm is connected by welding to a lower end of the annular wall portion;
a vertical distance D1 is shorter than a vertical distance D2 when the diaphragm has been deformed, the vertical distance D1 being between a position at a center of the diaphragm and a bottom surface of the region parallel to the sealing plate, the position being closest to the region parallel to the sealing plate, the vertical distance D2 being between the periphery of the diaphragm and the bottom surface of the region parallel to the sealing plate.

11. The non-aqueous electrolyte secondary battery of claim 1, wherein the first electrically insulating member is entirely located closer to the inside of the battery than the sealing plate is.

12. The non-aqueous electrolyte secondary battery of claim 1, wherein the diaphragm is shaped not to rupture when deformed.

13. The non-aqueous electrolyte secondary battery of claim 1, wherein the diaphragm has a substantially flat shape.

14. A non-aqueous electrolyte secondary battery comprising:

a prismatic outer can having an opening;
an electrode assembly housed in the outer can and including a positive electrode and a negative electrode;
a sealing plate sealing the opening;
a current collecting tab electrically connected to either the positive electrode or the negative electrode;
an external electrode terminal projecting outside the sealing plate;
a diaphragm disposed at a position of the battery, the position being inner than the sealing plate and outer than the current collecting tab, the diaphragm being conductive and electrically connected to the external electrode terminal and the current collecting tab;
a lead having a hollow portion to which the diaphragm is placed to cover the hollow potion and to allow the diaphragm to deform toward the hollow portion, the lead electrically connecting the external electrode terminal and the diaphragm;
a first electrically insulating member interposed between the sealing plate and the lead, the first electrically insulating member being entirely located closer to the inside of the battery than the sealing plate is; and
a second electrically insulating member interposed between the diaphragm and the current collecting tab, wherein
the second electrically insulating member has a throughhole, and an electric conduction path between the external electrode terminal and the electrode assembly passes through the throughhole;
the first electrically insulating member includes a pair of first side walls extending toward an inside of the battery from a body of the first electrically insulating member;
the second electrically insulating member includes a pair of second side walls extending toward an outside of the battery from a body of the second electrically insulating member;
the first side walls and the second side walls are coupled to each other;
the diaphragm deforms toward the outside of the battery in accordance with an increase in a gas pressure in the battery, thereby breaking an electric connection between the external electrode terminal and the electrode assembly;
the sealing plate is rectangular;
the first side walls have a plurality of projections on an outer surface thereof, and
the projections are arranged at intervals along a longitudinal side of the sealing plate so as to be fitted into the second side walls, the projections being engaged with the second side walls.

15. The non-aqueous electrolyte secondary battery of claim 14, wherein
the first side walls have a projection on an outer surface side thereof, and the second side walls include a fixing portion to be engaged with the projection; and
the projection and the fixing portion are engaged with each other to connect the first side walls and the second side walls together.

16. The non-aqueous electrolyte secondary battery of claim 14, further comprising a third insulating member, wherein
the external electrode terminal has a flange and a connecting portion disposed at one end of the flange;
the third insulating member is disposed at a position between the flange and an outer surface of the sealing plate;

the connecting portion penetrates a through hole formed in each of the third insulating member, the sealing plate, the first electrically insulating member, and the lead, a tip of the connecting portion being swaged at a position closer to the inside of the battery than the sealing plate is; and the flange is located farther from the inside of the battery than the sealing plate is.

17. The non-aqueous electrolyte secondary battery of claim 14, wherein the second side walls have inner surfaces extending toward the outside of the battery from the body of the second electrically insulating member;

the first side walls have outer surfaces extending toward the inside of the battery from the body of the first electrically insulating member;

the inner surfaces and the outer surfaces are faced and coupled in a direction parallel to the sealing plate to form a pair of the coupled surfaces facing to each other in the direction; and the lead is placed between the pair of the coupled surfaces.

18. The non-aqueous electrolyte secondary battery of claim 14, wherein the lead includes a region parallel to the sealing plate and an annular wall portion, the annular wall portion extending from a periphery of the region parallel to the sealing plate toward the inside of the battery;

the region parallel to the sealing plate and the annular wall portion are located inside the battery with respect to the sealing plate;

the first electrically insulating member is interposed between the sealing plate and the region parallel to the sealing plate; and the periphery of the diaphragm is connected by welding to a lower end of the annular wall portion.

19. The non-aqueous electrolyte secondary battery of claim 18, which is configured such that a vertical distance D1 is shorter than a vertical distance D2 when the diaphragm has been deformed, the vertical distance D1 being between a position at a center of the diaphragm and a bottom surface of the region parallel to the sealing plate, the position being closest to the region parallel to the sealing plate, the vertical distance D2 being between the periphery of the diaphragm and the bottom surface of the region parallel to the sealing plate.

* * * * *